(12) United States Patent
Wu et al.

(10) Patent No.: US 7,782,532 B2
(45) Date of Patent: Aug. 24, 2010

(54) OPTICAL ISOLATOR DEVICE

(75) Inventors: Li Wu, Fujian (CN); Xianghua Shi, Fujian (CN); Zan Gong, Fujian (CN); Jiwu Ling, Fujian (CN); Zhaoyang Sun, Fujian (CN); Xiangtong Yang, Fujian (CN); Yunbin Xu, Fujian (CN); Lei Lin, Fujian (CN); Fuquan Huang, Fujian (CN)

(73) Assignee: Photop Technologies, Inc., Fuzhou (CN)

( * ) Notice: Subject to any disclaimer, the term of this patent is extended or adjusted under 35 U.S.C. 154(b) by 249 days.

(21) Appl. No.: 12/120,002

(22) Filed: May 13, 2008

(65) Prior Publication Data

US 2009/0046347 A1 Feb. 19, 2009

(51) Int. Cl.
*G02B 5/30* (2006.01)
(52) U.S. Cl. ............... 359/494; 359/484; 359/495; 359/497; 385/11; 385/31
(58) Field of Classification Search ......... 359/280–283, 359/250, 251, 256, 483, 484, 488, 494, 495, 359/497, 857; 385/6, 11, 15, 16, 24, 27, 385/31, 33, 47, 140; 324/96, 244.1; 250/551
See application file for complete search history.

(56) References Cited

U.S. PATENT DOCUMENTS

| | | | | |
|---|---|---|---|---|
| 4,375,910 A * | 3/1983 | Seki | ............................ | 359/484 |
| 4,548,487 A * | 10/1985 | Nielsen | ........................ | 353/120 |
| 5,428,477 A * | 6/1995 | Siroki | ........................... | 359/484 |
| 5,499,307 A * | 3/1996 | Iwatsuka | ........................ | 385/11 |
| 5,691,845 A * | 11/1997 | Iwatsuka et al. | ............. | 359/497 |
| 5,936,768 A * | 8/1999 | Oguma | ......................... | 359/484 |
| 6,048,103 A * | 4/2000 | Furukata et al. | ................. | 385/73 |
| 6,061,167 A * | 5/2000 | Song | ............................. | 359/256 |
| 6,339,661 B1 * | 1/2002 | Kokkelink et al. | ............. | 385/11 |
| 6,377,720 B1 * | 4/2002 | Kokkelink | ....................... | 385/11 |
| 6,462,539 B2 * | 10/2002 | Moriya et al. | ............. | 324/244.1 |
| 6,631,238 B2 * | 10/2003 | Liu et al. | ....................... | 385/140 |
| 6,839,170 B2 | 1/2005 | Li | | |
| 6,872,012 B2 | 3/2005 | Watanabe | | |
| 6,952,300 B2 | 10/2005 | Levy | | |
| 7,024,073 B2 * | 4/2006 | Sahashi et al. | ................. | 385/31 |
| 7,065,265 B2 | 6/2006 | Hammer | | |
| 7,149,404 B2 | 12/2006 | Ide | | |
| 7,176,671 B2 * | 2/2007 | Kurosawa et al. | .............. | 324/96 |
| 7,180,098 B2 | 2/2007 | Speyer | | |
| 7,206,116 B2 | 4/2007 | Fehn | | |
| 7,251,394 B2 | 7/2007 | Sato | | |
| 7,321,463 B2 * | 1/2008 | Takeuchi et al. | ............. | 359/495 |

* cited by examiner

*Primary Examiner*—Loha Ben
(74) *Attorney, Agent, or Firm*—Xin Wen

(57) ABSTRACT

An optical isolator includes a birefringent material and a Faraday rotator. The birefringent material receives a forward light propagating in a forward direction and a backward light propagating opposite to the forward direction. The birefringent material has an optical axis, wherein the forward light has a first polarization aligned perpendicular to the optical axis and is configured to pass the first birefringent material substantially along the forward direction. At least a portion of the backward light has a second polarization not perpendicular to the optical axis. The first birefringent material can displace the backward light to form a first displaced backward light. A Faraday rotator can rotate the forward light, and the backward light or the first displaced backward light by a same predetermined angle along the rotation direction.

25 Claims, 15 Drawing Sheets

OPTICAL ISOLATOR DEVICE

CROSS-REFERENCES TO RELATED INVENTIONS

The present invention claims priority to commonly assigned Chinese Patent Application No. 200720007963.X, titled "a polarization related free space optical isolator", filed on Aug. 17, 2007, and Chinese Patent Application No. 200720008166.3, titled "a polarization related free space optical isolator", filed on Sep. 7, 2007. The disclosures of these related applications are incorporated herein by reference.

BACKGROUND

The present disclosure relates to optical devices for optical communications.

Optical isolator is an optical element that is often used to reduce the backward light in optical transmissions. Optical isolator is a nonreciprocal transmitting device. It allows a light from a light source to pass in a forward direction but prevents light to transmit in a backward direction, thus isolating the light source from the backward light. Free space isolator is a type of optical isolator often used in optical transceivers and tunable lasers.

A conventional free space isolator 10, referring to FIG. 1, can include a first polarizer 11, a Faraday rotator 12, and a second polarizer 13. The optical axes of the first polarizer 11 and the second polarizer 13 are oriented at a 45° angle. The Faraday rotator 12 is a nonreciprocal optical element. It can rotate the polarization of an incident light or a backward light by 45° along a same direction 15. After the incident light passes the first polarizer 11, its polarization is aligned to be parallel to the optical axis of the first polarizer 11. The polarization of the incident light is then rotated by 45° along the direction 15 by the Faraday rotator 12 such that the polarization becomes parallel to the optical axis of the second polarizer 13, allowing incident light to pass through the second polarizer 13.

Backward lights always exist in optical systems. Backward light can include unwanted or astray lights reflected or scattered from various optical elements in the optical system. A backward light typically has randomized polarizations. Its polarization is linearized to be parallel to the optical axis of the second polarizer 13 as it enters the free space isolator 10. The Faraday rotator then rotates the polarization of the backward light along the same direction 15, making its polarization perpendicular to the optical axis of the first polarizer 11. The backward light is thus blocked by the first polarizer 11, which isolates the backward light from the source direction of the incident light.

The above described conventional free space isolator has several drawbacks. It is rather expensive because of the costs of the two polarizing crystals (typically implemented by Polacors) and the Faraday rotator. There is thus a need for a simpler, effective, and less expensive optical isolator.

SUMMARY

In a general aspect, the present invention relates to an optical isolator that includes a first birefringent material having a surface that can receive a forward light propagating in a forward direction and to receive a backward light propagating opposite to the forward direction, wherein the first birefringent material has an optical axis at about 45 degree angle relative to the surface, wherein the forward light has a first polarization aligned perpendicular to the optical axis and can travel through the first birefringent material as an ordinary ray substantially along the forward direction, wherein at least a portion of the backward light has a second polarization not perpendicular to the optical axis, wherein at least a portion of the backward light travels substantially as an extraordinary ray in the birefringent crystal, wherein the first birefringent material can displace the backward light to form a first displaced backward light; and a Faraday rotator that can rotate the forward light by a predetermined angle along a rotation direction, wherein the Faraday rotator can rotate the backward light or the first displaced backward light by substantially the same predetermined angle along the rotation direction.

In another general aspect, the present invention relates to an optical isolator that includes a first birefringent material that can receive a forward light propagating in a forward direction and to receive a backward light propagating opposite to the forward direction, wherein the first birefringent material has an optical axis, wherein the forward light has a first polarization aligned perpendicular to the optical axis and can pass the first birefringent material substantially along the forward direction, wherein at least a portion of the backward light has a second polarization not perpendicular to the optical axis, wherein the first birefringent material can displace the backward light to form a first displaced backward light; and a Faraday rotator that can rotate the forward light by a predetermined angle along a rotation direction, wherein the Faraday rotator can rotate the backward light or the first displaced backward light by substantially the same predetermined angle along the rotation direction.

In another general aspect, the present invention relates to an optical isolator that includes a birefringent material that can receive a forward light propagating in a forward direction and to receive a backward light propagating opposite to the forward direction, wherein the birefringent material has an optical axis, wherein the forward light has a first polarization aligned perpendicular to the optical axis and can pass the birefringent material substantially along the forward direction, wherein at least a portion of the backward light has a second polarization not perpendicular to the optical axis, wherein the birefringent material can displace the backward light to form a displaced backward light; a Faraday rotator that can rotate the forward light by a rotation angle between about 40 degrees and about 50 degrees along a rotation direction, wherein the Faraday rotator can rotate the backward light or the displaced backward light by substantially the same rotation angle along the rotation direction; and a polarizer having a polarization axis oriented at about 45 degrees relative to the first polarization, wherein the polarizer can pass the forward light and to pass the portion of the backward light having the second polarization.

In another general aspect, the present invention relates to an optical isolator that includes a first birefringent material that can receive a forward light propagating in a forward direction and to receive a backward light propagating opposite to the forward direction, wherein the first birefringent material has a optical axis, wherein the forward light has a first polarization aligned perpendicular to the optical axis and can pass the first birefringent material substantially along the forward direction, wherein at least a portion of the backward light has a second polarization not perpendicular to the optical axis, wherein the first birefringent material can displace the backward light to form a first displaced backward light; a Faraday rotator that can rotate the forward light by a rotation angle between about 40 degrees and about 50 degrees along a rotation direction, wherein the Faraday rotator can rotate the backward light or the first displaced backward light by substantially the same rotation angle along the rotation direction; and a second birefringent material having a polarization axis oriented at 45 degrees relative to the optical axis, wherein the second birefringent material can allow the forward light to pass through along the forward direction and to displace the portion of the backward light having the second polarization not perpendicular to the optical axis to produce a second displaced backward light.

Implementations of the system may include one or more of the following. The optical isolator can further include a polarizer having a polarization axis oriented at about 45 degrees relative to the first polarization, wherein the polarizer can pass the forward light and to pass the portion of the backward light having the second polarization. The polarizer, the Faraday rotator, and the first birefringent material are sequentially positioned along the forward direction. The first birefringent material, the Faraday rotator, and the polarizer are sequentially positioned along the forward direction. The polarizer, the Faraday rotator, and the first birefringent material are held in contact with each other to form a unitary component. At least two of the polarizer, the Faraday rotator, and the first birefringent material are separated by a medium or free space. The forward light travels substantially as an ordinary ray in the first birefringent crystal, wherein at least a portion of the backward light travels substantially as an extraordinary ray in the first birefringent crystal. The first birefringent crystal comprises a surface that receives the forward light, wherein the optical axis is at about 45 degree angle relative to the surface. The optical isolator can further include an optical blocker that can block the first displaced backward light. The optical isolator can further include a second birefringent material having a polarization axis oriented at 45 degrees relative to the optical axis, wherein the second birefringent material can allow the forward light to pass through along the forward direction and to displace the portion of the backward light having the second polarization not perpendicular to the optical axis to produce a second displaced backward light. The forward light travels substantially as an ordinary ray in the second birefringent crystal, wherein at least a portion of the backward light travels substantially as an extraordinary ray in the second birefringent crystal. The polarization axis is rotated by about 45 degrees from the optical axis along the rotation direction. The first birefringent material, the Faraday rotator, and the second birefringent material are held in contact with each other to form a unitary component. At least two of the first birefringent material, the Faraday rotator, and the second birefringent material are separated by a medium or free space. The optical isolator can further include an optical blocker that can block the first displaced backward light and the second displaced backward light. The predetermined angle is between about 40 degrees and about 50 degrees. The first birefringent material can displace the backward light to form the first displaced backward light separated more than 5 microns from the forward light.

Embodiments may include one or more of the following advantages. The disclosed systems and methods provide a compact and lower cost optical isolating device by using less expensive components and materials. The disclosed optical isolating device can be integrated in a unitary optical assembly that can be easily used in a wider range of applications. The disclosed optical isolating device is more effective in preventing backward light from affecting the operations of a light source.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 1:
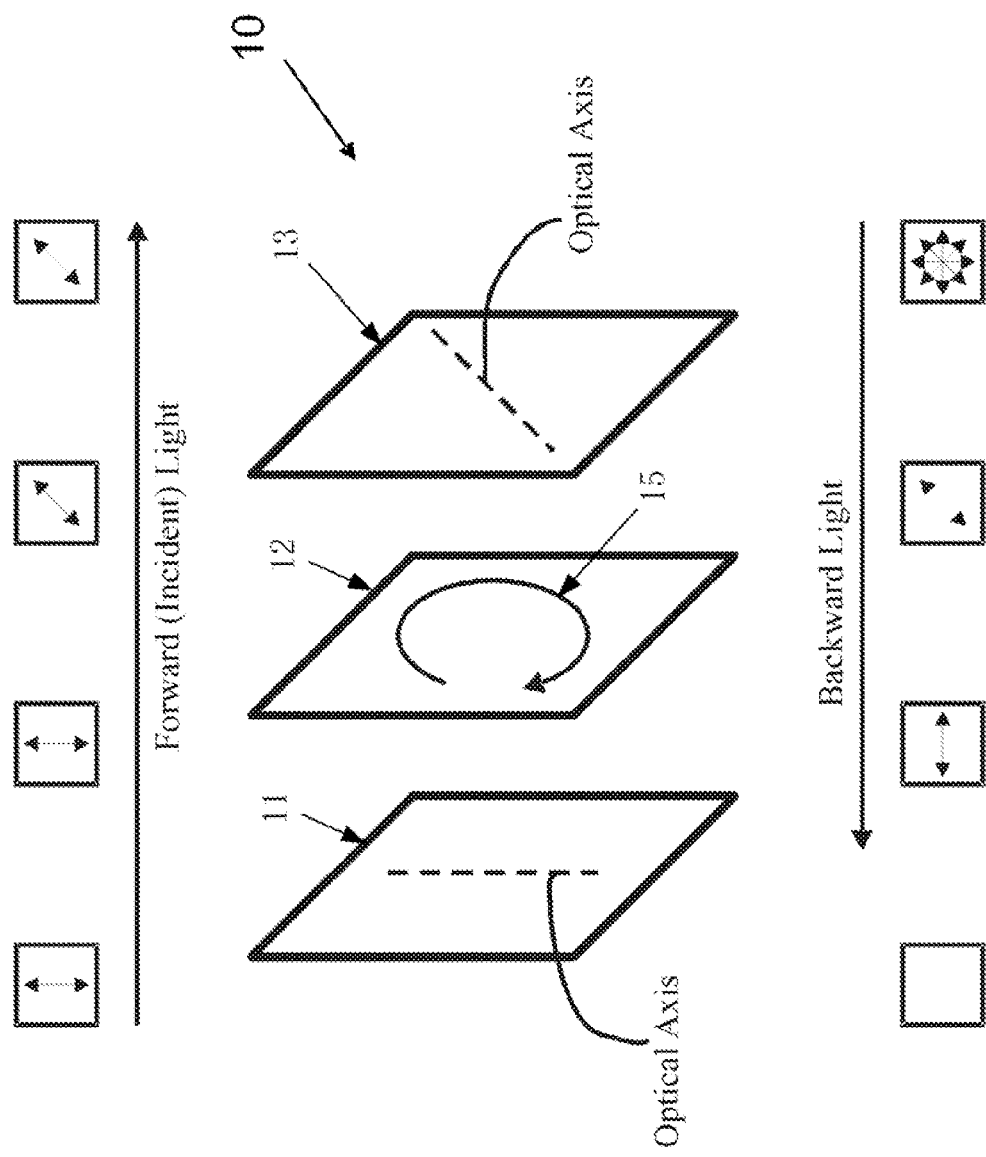
FIG. 1 is a diagram that illustrates the principle of the conventional free space isolator.
Figure 2A:
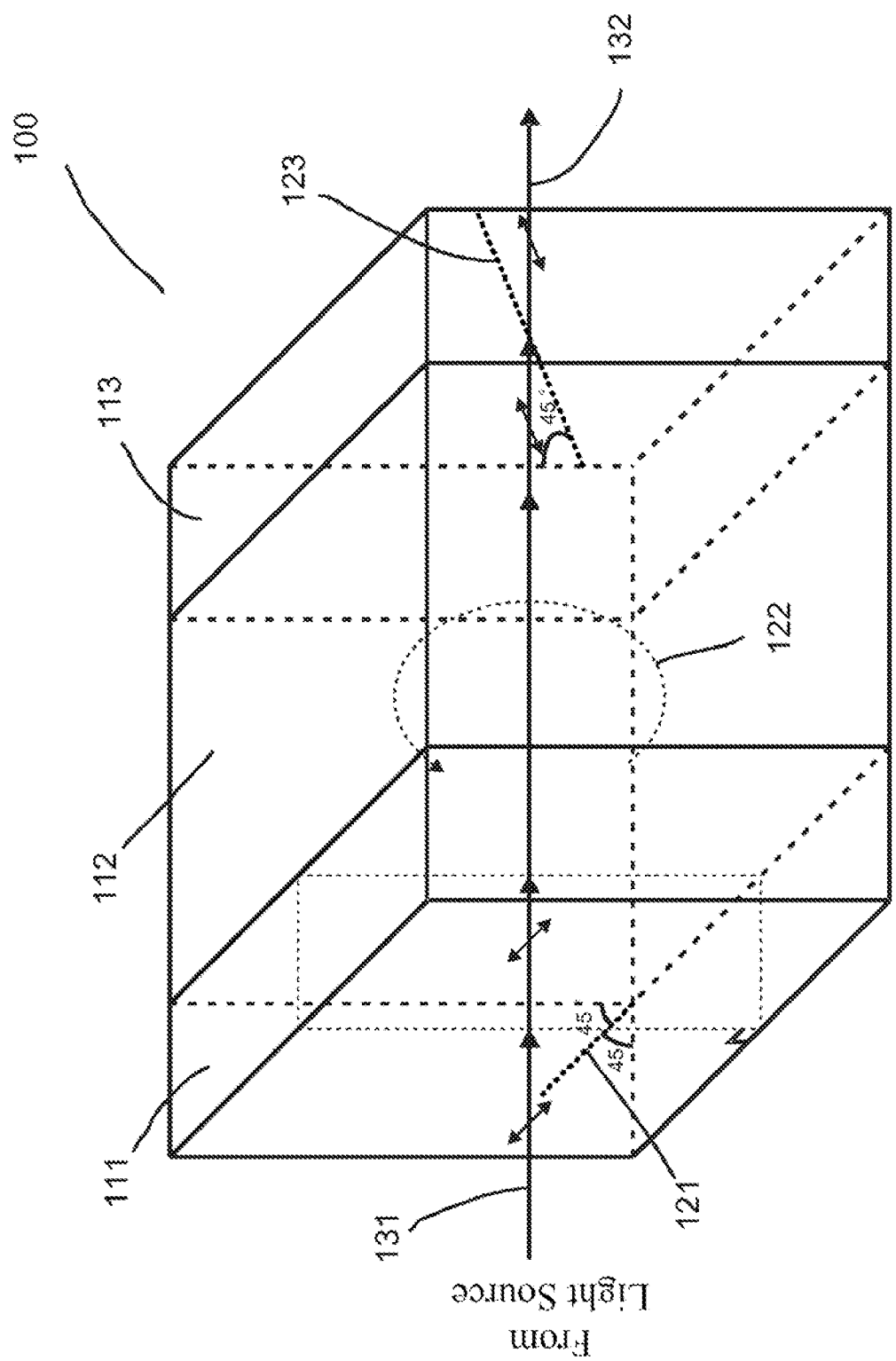
FIG. 2A is schematic diagram illustrating an optical assembly with a forward light passing through the optical assembly.

Referring to FIG. 2A, an optical assembly 100 includes a birefringent crystal 111, a Faraday rotator 112, and a polarizer 113, which are sequentially positioned along the direction of a forward (i.e. incident) light 131 emitted by a light source (not shown) such as a laser or light emitting diode. The polarizer 113 is a linear polarizer and can be implemented by a polarizing crystal such as a Polacor, available from Polaroid, Corp., a plastic polarizer, or many other forms of polarizers. Materials suitable for the birefringent crystal 111 include Yttrium Vanadate Crystal ($YVO_4$) and calcite, which is typically less expensive than a polarizing crystal. The birefringent crystal 111, the Faraday rotator 112, and the polarizer 113 can be separated by free space (or air) or other medium. The birefringent crystal 111, the Faraday rotator 112, and the polarizer 113 can also be glued together using an organic or inorganic adhesive material or bonded together by direct optical bonding to form a unitary optical assembly 100.

The forward light 131 first enters the birefringent crystal 111 in the optical assembly 100. The birefringent crystal 111 has an optical axis 121 that defines an axis of anisotropy in its refractive indices, which in turn defines propagating directions of an ordinary ray or an extraordinary ray propagating in the birefringent crystal 111. The forward light 131 has a polarization perpendicular to the optical axis 121 and thus propagates through the birefringent crystal 111 as an ordinary ray without changing its direction. (The optical axis 121 is parallel to the viewing plane of FIG. 2A and is at an approximately 45° angle to the light-entering face of the birefringent crystal 111.)

After the forward light 131 passes the birefringent crystal 111, it enters the Faraday rotator 112. The Faraday rotator 112 can rotate the polarization of the forward light 131 by a rotation angle in the direction 122. The rotation angle is between about 40 degrees and about 50 degrees, preferably 45°. While the forward light 131 passes the Faraday rotator 112, its polarizing direction is rotated by the rotation angle (e.g. approximately 45°) along the rotation direction 122.

The polarizer 113 has a polarization axis 123 oriented at an approximately 45° along the direction 122 from the polarizing direction of the forward light 131 in the birefringent crystal 111. After passing the Faraday rotator 112, the polarizing direction of the forward light 131 becomes parallel to the polarization axis 123 and can pass through the polarizer 113 to form an output light 132.

Figure 2B:
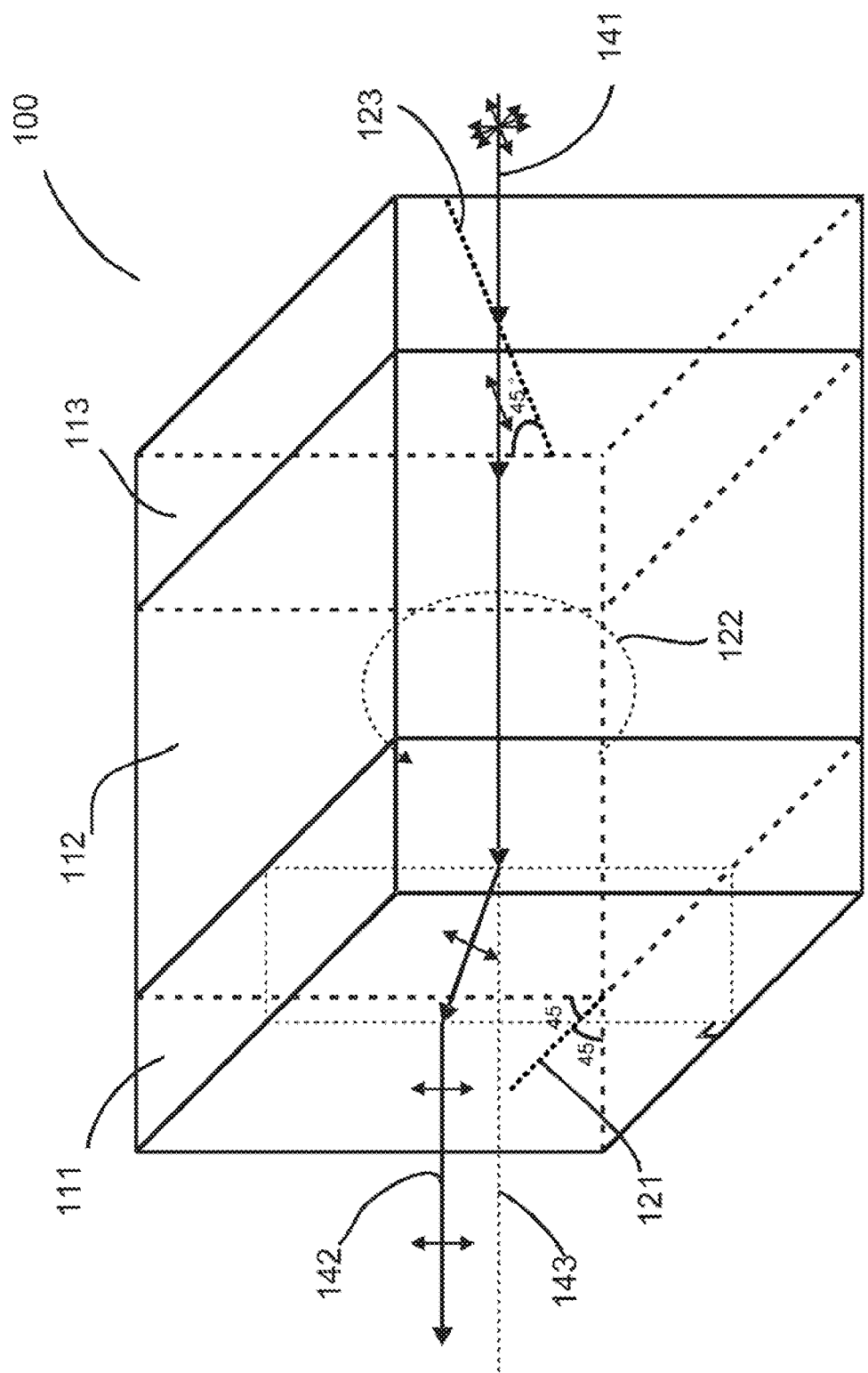
FIG. 2B illustrates the optical assembly of FIG. 2A with a backward light blocked by the optical assembly.

Backward lights are often produced in an optical system by unwanted reflections or scatterings of the forward light. Backward lights are typically randomly polarized or partially randomly polarized. Unless properly isolated, backward light can travel back to the light source, which can affect the proper function of the light source. Referring to FIG. 2B, the randomly polarized backward lights 141 first reaches the polarizer 113 in the optical assembly 100. The portion of the backward lights whose polarization is parallel to the polarization axis 123 passes through the polarizer 113 to reach the Faraday rotator 112 while the other portions are absorbed by the polarizer 113.

As is known in this art, a Faraday rotator is a nonreciprocal optical element. That is, the Faraday rotator 112 rotates the polarization of the backward light 141 along the same direction 122 as it does to the forward light 131. After passing the Faraday rotator 112, the backward light 141 has its polarization rotated by 45° along the direction 122. The polarization of the backward light 141 is perpendicular to the polarization of the forward light 131. The polarization of the backward light 141 is aligned in the plane defined by its propagation direction and the optical axis 121, and thus the backward light 141 travels as an extraordinary ray along deflected direction in the birefringent crystal 111. The backward light 141 exits the birefringent crystal 111 to form a displaced backward light 142, which is displaced by a distance from the original propagation direction 143 of the back ward light 141. As described below, the displaced backward light 142 can be properly blocked or absorbed to prevent it from reaching the light source that produces the forward light 131.

It should be understood that the optical assembly 100 can be made in some other configurations without deviating from the spirit of the invention. The optical axes of the birefringent crystal 111, the polarizer 113 and the rotation direction of the Faraday rotator 112 can be different. Different materials can be used for the birefringent crystal and the polarizer. The birefringent crystal can have different birefringence or thicknesses for displacing the backward light. For example, the birefringent crystal can have a thickness in the range of 0.1 mm to 0.4 mm in the light transmission direction. The amount of displacement of the backward light, or the distance between the displaced backward light 142 and the forward light 131, can be more than 5 microns, or in a range from about 10 microns to 40 microns. For example, a YVO4 birefringent crystal can have a thickness of about 0.3 mm. The backward light can be displaced by about 30 microns.

Figure 2C:
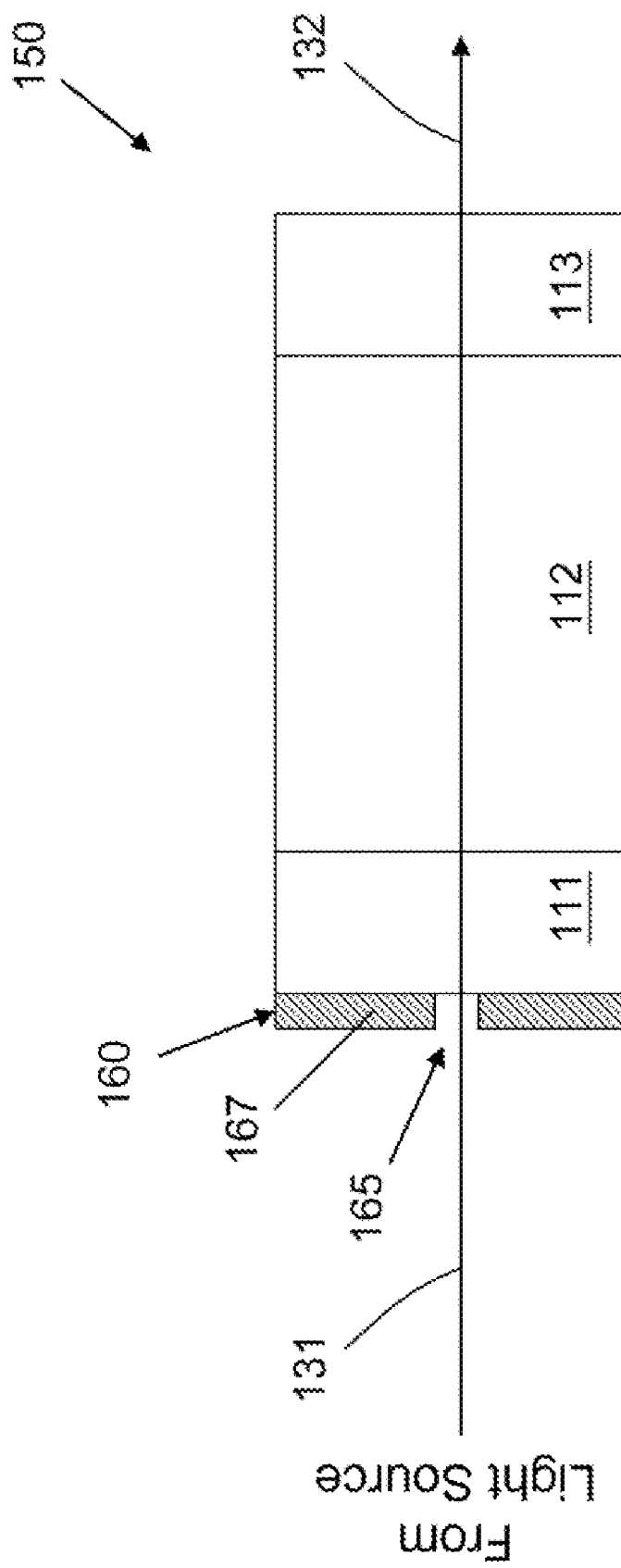
FIG. 2C shows an arrangement for an improved optical isolator employing the optical assembly in FIGS. 2A-2B illustrating a forward light passing through the optical isolator.
Figure 2D:
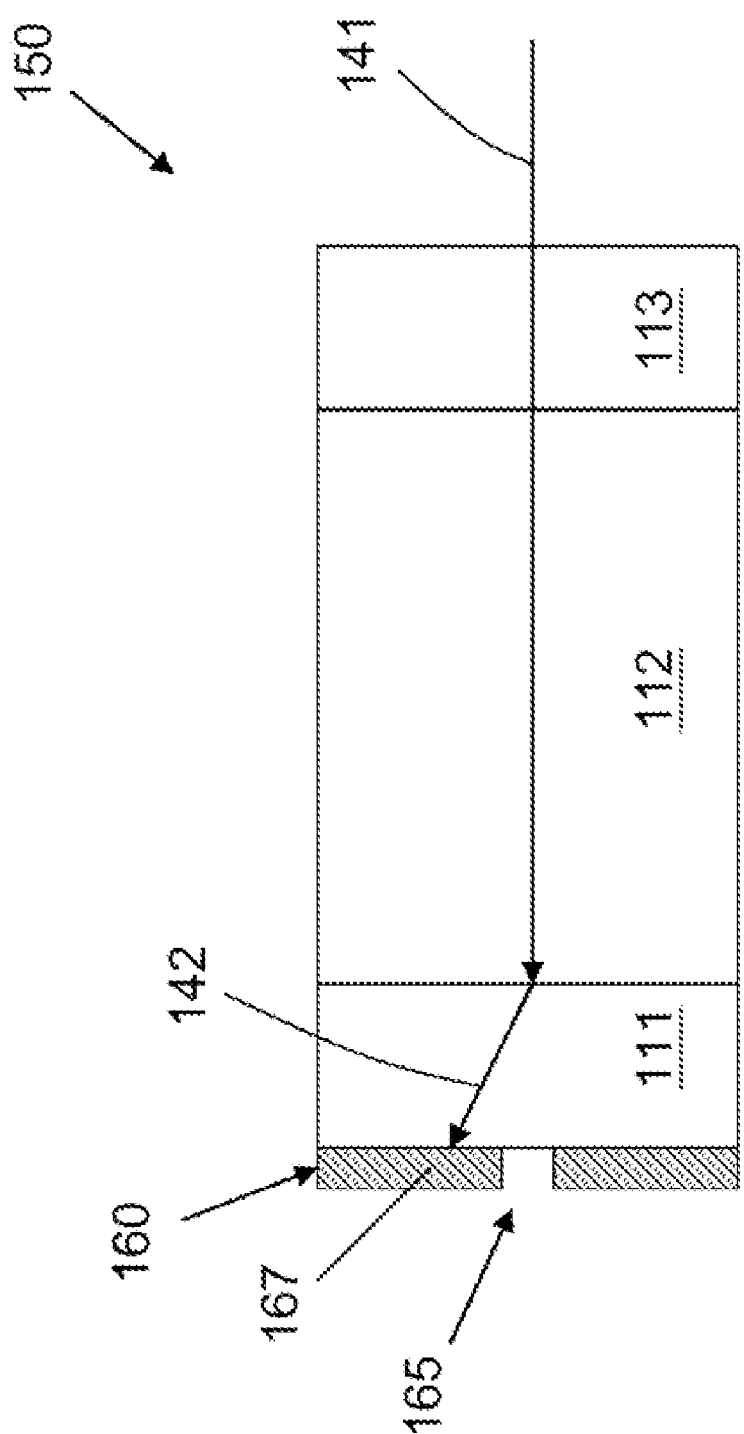
FIG. 2D shows an arrangement for an improved optical isolator of FIG. 2C illustrating a backward light blocked by the optical isolator.

The optical assembly 100 can be used to construct an optical isolator 150 as shown in FIGS. 2C and 2D. The optical isolator 150 can include an opaque optical blocker 160, the birefringent crystal 111, the Faraday rotator 112, and the polarizer 113. As described above, the birefringent crystal 111, the Faraday rotator 112, and the polarizer 113 can be separated by free space (or air) or some other mediums, and bonded together. The opaque optical blocker 160 is positioned adjacent to or in contact with the front outer surface of the birefringent crystal 111. The optical blocker 160 can be separated from the birefringent crystal 111. The optical blocker 160 can also be glued to the birefringent crystal 111, which allows the optical isolator 150 to form a unitary component.

In some embodiments, the opaque optical blocker 160 is provided by a housing wall or an outer surface of another optical component in the optical system that the optical assembly 100 is installed. An example of an optical system is a laser system. In other words, a dedicated optical blocker is not provided with the optical assembly 100. The optical assembly 100 can be used as a stand-alone optical isolator, which simplifies the optical isolator and can further reduce cost. It should be noted that the displaced backward light 142 has a polarization perpendicular to the polarization of the forward light 131. The light source is not affected by the displaced backward light 142 even if a small portion of it is scattered (e.g. by other optical components in the optical system) and coupled back into the light source.

The optical blocker 160 is made of an opaque and preferably, light absorbing, material such as metallic, polymeric, or an inorganic material. In some embodiment, a layer of light absorbing material such as amorphous carbon can be coated on a portion of the outer surface of the birefringent crystal 111. The optical blocker 160 exposes a portion of the outer surface of the birefringent crystal 111 to allow the forward light 131 to enter the birefringent crystal 111. The optical blocker 160 can also block and/or absorb the displaced backward light 142, preventing it from exiting the birefringent crystal 111, thus isolating the backward light from the light source. The optical blocker 160 can exist in many different forms as long as it provides the above described functions. For example, the optical blocker 160 can be an aperture structure that includes an opening 165 that allows the forward light 131 to enter and pass through the birefringent crystal 111, the Faraday rotator 112, and the polarizer 113. The aperture structure includes an opaque portion 167 that can block and absorb the displaced backward light 142.

Figure 3A:
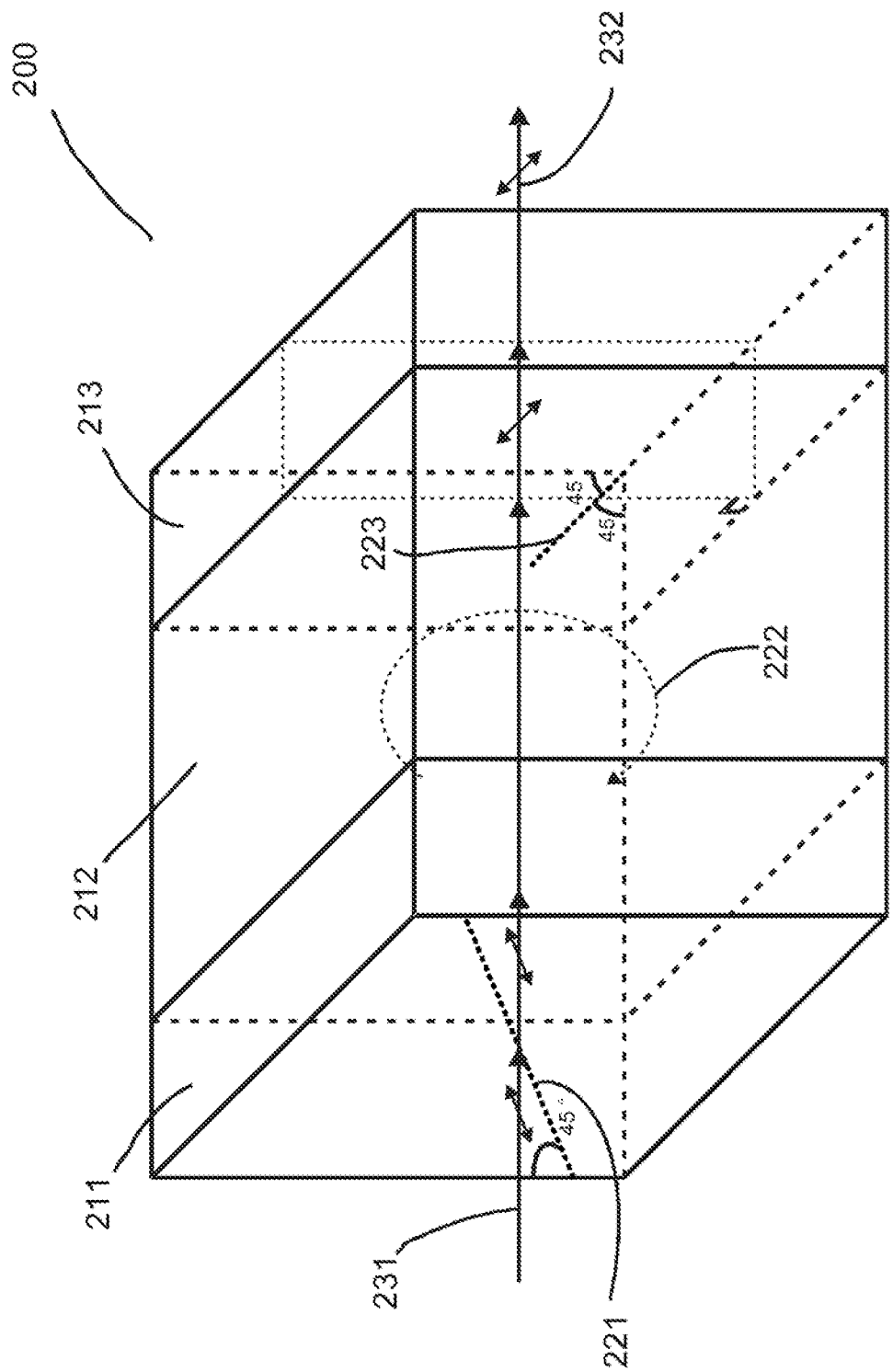
FIG. 3A is schematic diagram illustrating another optical assembly with a forward light passing through the optical assembly.
Figure 3B:
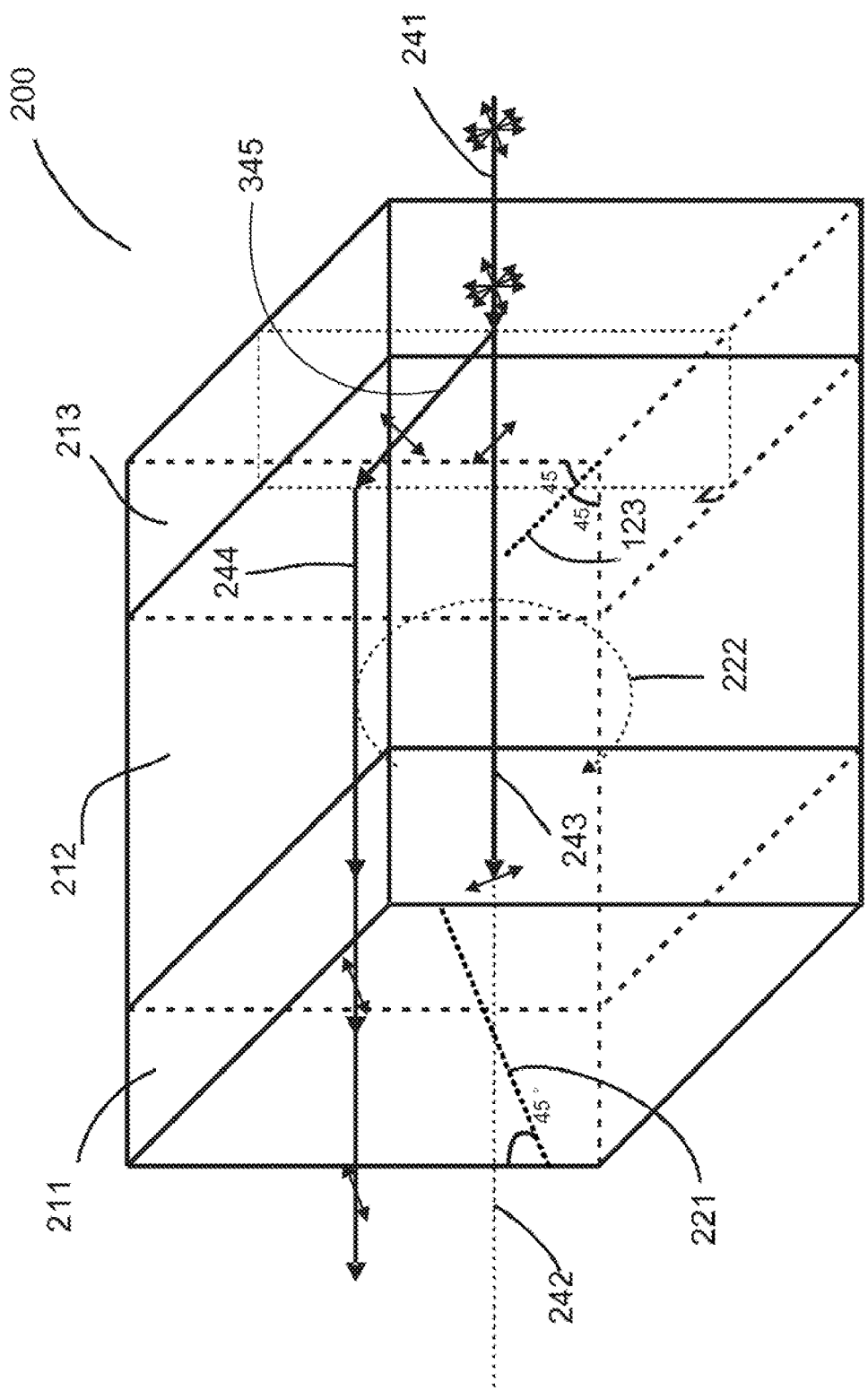
FIG. 3B illustrates the shows the optical assembly of FIG. 3A with a backward light isolated by the optical assembly.

In some embodiments, referring to FIGS. 3A and 3B, an optical assembly 200 includes a polarizer 211, a Faraday rotator 212, and a birefringent crystal 213, which are sequentially positioned along the direction of a forward light (or an incident light) 231 emitted by a light source. The polarizer 211 can be a polarizing crystal such as a Polacor, available from Polaroid, Corp., a plastic polarizer, or other types of polarizers. Materials suitable for the birefringent crystal 213 include Yttrium Vanadate Crystal ($YVO_4$) and calcite which is typically less expensive than a polarizing crystal. The polarizer 211, the Faraday rotator 212, and the birefringent crystal 213 can be separated by free space (or air) or other medium. The polarizer 211, the Faraday rotator 212, and the birefringent crystal 213 can also be glued together using an adhesive material or bonded together by direct optical bonding to form a unitary optical assembly 200.

The polarizer 211 has a polarization axis 221 that is tilted at a 45° angle relative to the horizontal direction (as viewed in FIG. 3A). The forward light 231 first enters the polarizer 211 and maintains its polarization along the polarization axis 221. As the forward light 231, the Faraday rotator 212 rotates the polarization of the forward light 231 by about 45° along the direction 222.

An optical axis 232 in the birefringent crystal 213 defines an axis of anisotropy in its refractive indices, which in turn defines propagating directions of an ordinary ray or an extraordinary ray propagating in the birefringent crystal 213. (The optical axis 232 is parallel to the viewing plane of FIG. 3A and is at an approximately 45° angle to the light-exiting face of the birefringent crystal 213.) The forward light 231 has a polarization perpendicular to the optical axis 223 and thus propagates through the birefringent crystal 213 as an ordinary ray without changing its direction, thereby forming an output light 232 exiting the birefringent crystal 213.

Referring to FIG. 3B, when the randomly polarized backward lights 241 enters the birefringent crystal 213 in a backward direction, the backward lights 241 is decomposed to travel in two different directions 242 and 245. A first backward light 243 propagates as an ordinary ray in the birefringent crystal 213 along the direction 242. A second backward light 245 travels as an extraordinary ray in a different direction 345 in the birefringent crystal 213, forming a displaced backward light 244 as it exits the birefringent crystal 213 and enters the Faraday rotator 212. The first backward light 243 and the displaced backward light 244 pass through the Faraday rotator 212 in two parallel paths. The polarization directions of the first backward light 243 and the displaced backward light 244 are both are rotated by 45° along the 222 direction. The polarization direction of the first backward light 243 becomes perpendicular to the polarization axis 221 and is absorbed by the polarizer 211. The first backward light 243 thus cannot reach the light source. The displaced backward light 244 has its polarization parallel to the polarizing axis 221 and can pass through the polarizer 211. The displaced backward light 244 can be subsequently blocked or absorbed by an optical blocker (260 in FIGS. 3C and 3D) and is isolated from the light source.

It should be understood that the optical assembly 200 can be made in some other configurations without deviating from the spirit of the invention. The optical axes of the polarizer 211 and the birefringent crystal 213 and the rotation direction of the Faraday rotator 212 can be different. Different materials can be used for the birefringent crystal and the polarizer. The birefringent crystal can have different birefringence or thicknesses for displacing the backward light. For example, the birefringent crystal can have a thickness in the range of 0.1 mm to 0.4 mm in the light transmission direction. The amount of displacement of the backward light, or the distance between the displaced backward light 244 and the forward light 231, can be more than 5 microns, or in a range from about 10 microns to 40 microns. For example, the birefringent crystal can have a thickness of about 0.3 mm. The backward light can be displaced by about 30 microns.

Figure 3C:
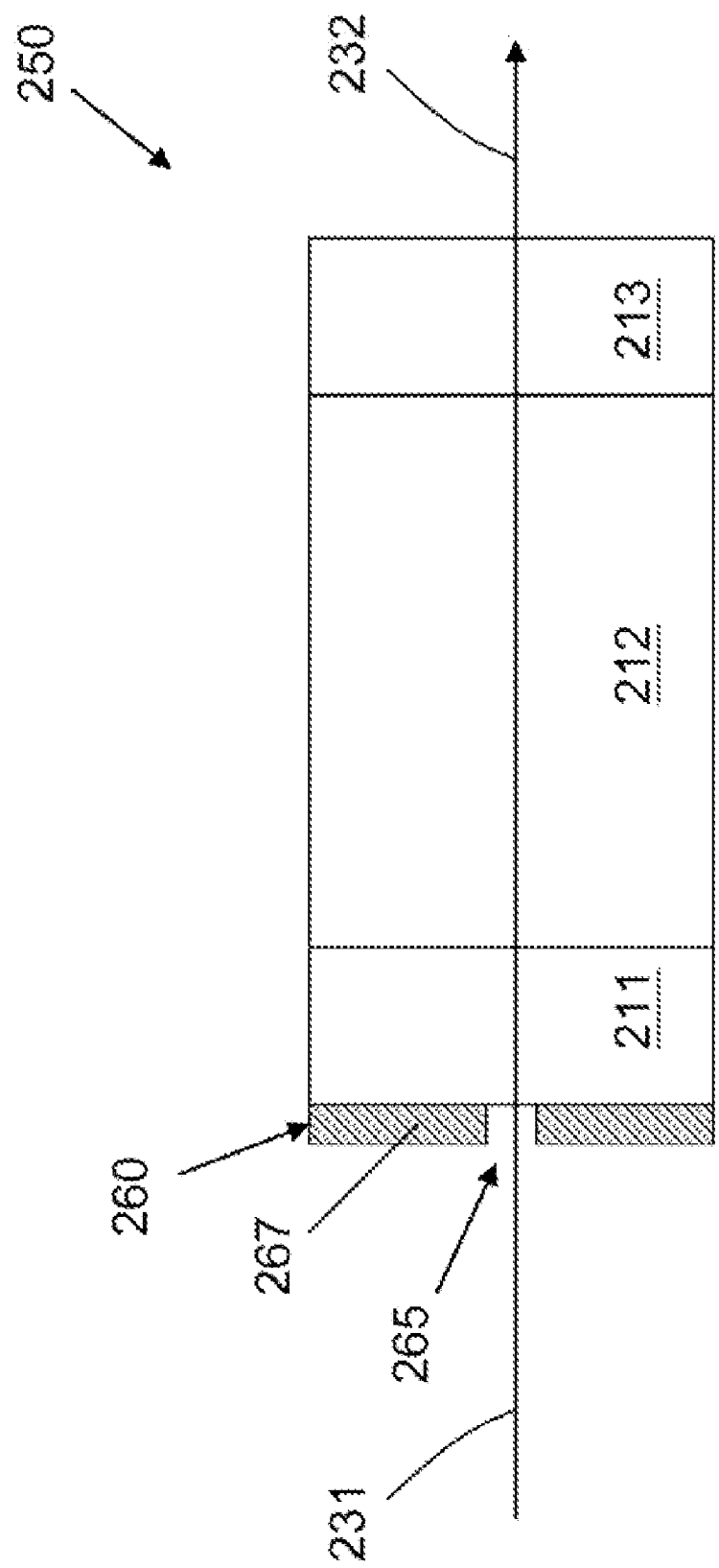
FIG. 3C shows an arrangement for an improved optical isolator employing the optical assembly in FIGS. 3A-3B illustrating a forward light passing through the optical isolator.
Figure 3D:
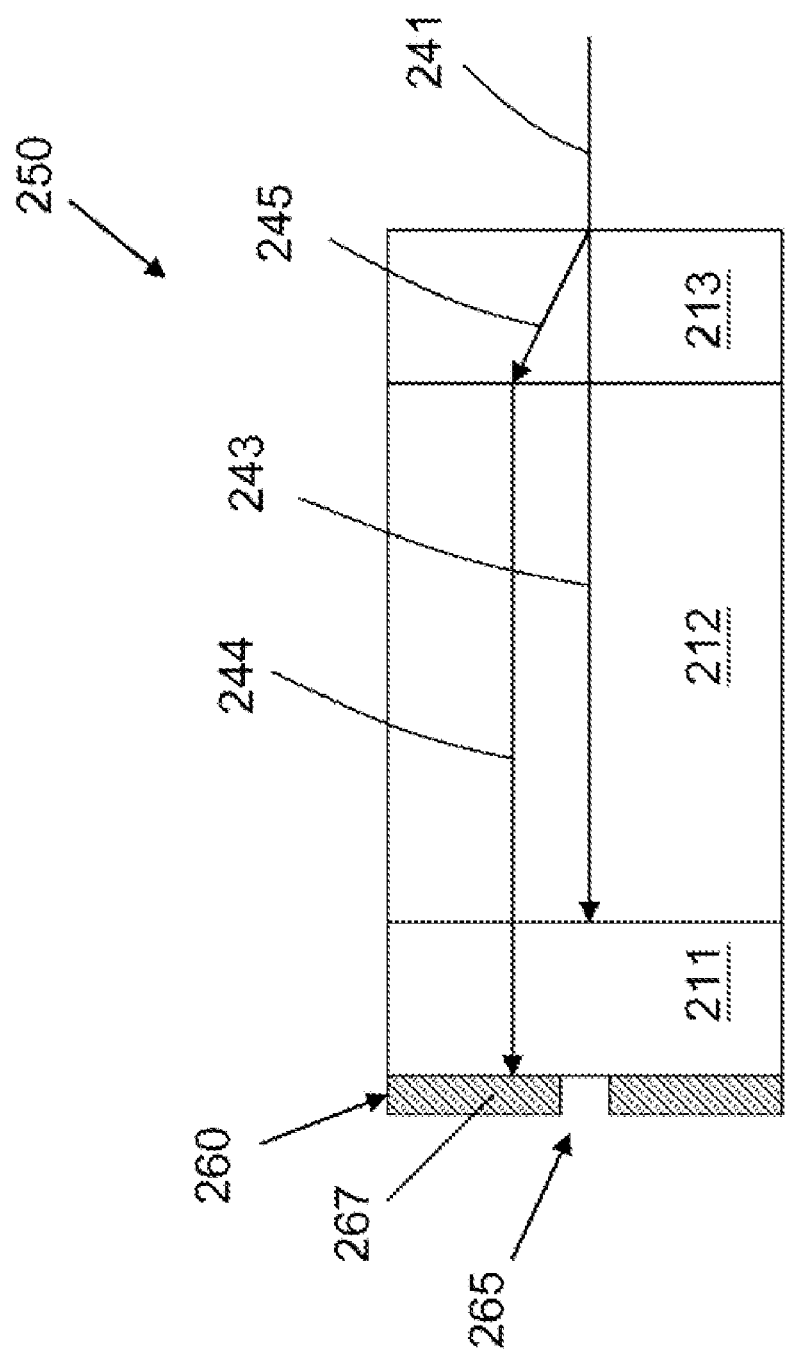
FIG. 3D shows an arrangement for an improved optical isolator of FIG. 3C illustrating a backward light blocked by the optical isolator.

The optical assembly 200 can be used to construct an optical isolator 250 as shown in FIGS. 3C and 3D. The optical isolator 250 can include an opaque optical blocker 260, the polarizer 211, the Faraday rotator 212, and the birefringent crystal 213. As described above, the polarizer 211, the Faraday rotator 212, and the birefringent crystal 213 can be separated by free space (or air) or some other mediums, and bonded together. The opaque optical blocker 260 is positioned adjacent to or in contact with the front outer surface of the polarizer 211. The optical is blocker 260 can be separated from the polarizer 211. The optical blocker 260 can also be glued to the polarizer 211, which allows the optical isolator 250 to form a unitary component.

The optical blocker 260 is made of an opaque and preferably, light absorbing, material such as metallic, polymeric, or an inorganic material. In some embodiment, a layer of light absorbing material such as amorphous carbon can be coated on a portion of the outer surface of the polarizer 211. The optical blocker 260 exposes a portion of the outer surface of the polarizer 211 to allow the forward light 231 to enter the polarizer 211. The optical blocker 260 can also block and/or absorb the displaced backward light 244, preventing it from exiting the polarizer 211, thus isolating the backward light from the light source.

The optical blocker 260 can exist in many different forms as long as it provides the above described functions. For example, the optical blocker 260 can be an aperture structure that includes an opening 265 that allows the forward light 231 to pass through to the polarizer 211, the Faraday rotator 212, and the birefringent crystal 213. The aperture structure includes opaque portion 267 that can block and absorb the displaced backward light 244.

In some embodiments, the opaque optical blocker 260 is provided by a housing wall or an outer surface of another optical component in the optical system that the optical assembly 200 is installed. An example of an optical system is a laser system. In other words, a dedicated optical blocker is not provided with the optical assembly 200. The optical assembly 200 can be used as a stand-alone optical isolator, which simplifies the optical isolator and can further reduce cost. It should be noted that the displaced backward light 244 has a polarization perpendicular to the polarization of the forward light 231. The light source is not affected by the displaced backward light 244 even if a small portion of it is scattered (e.g. by other optical components in the optical system) and coupled back into the light source.

Figure 4A:
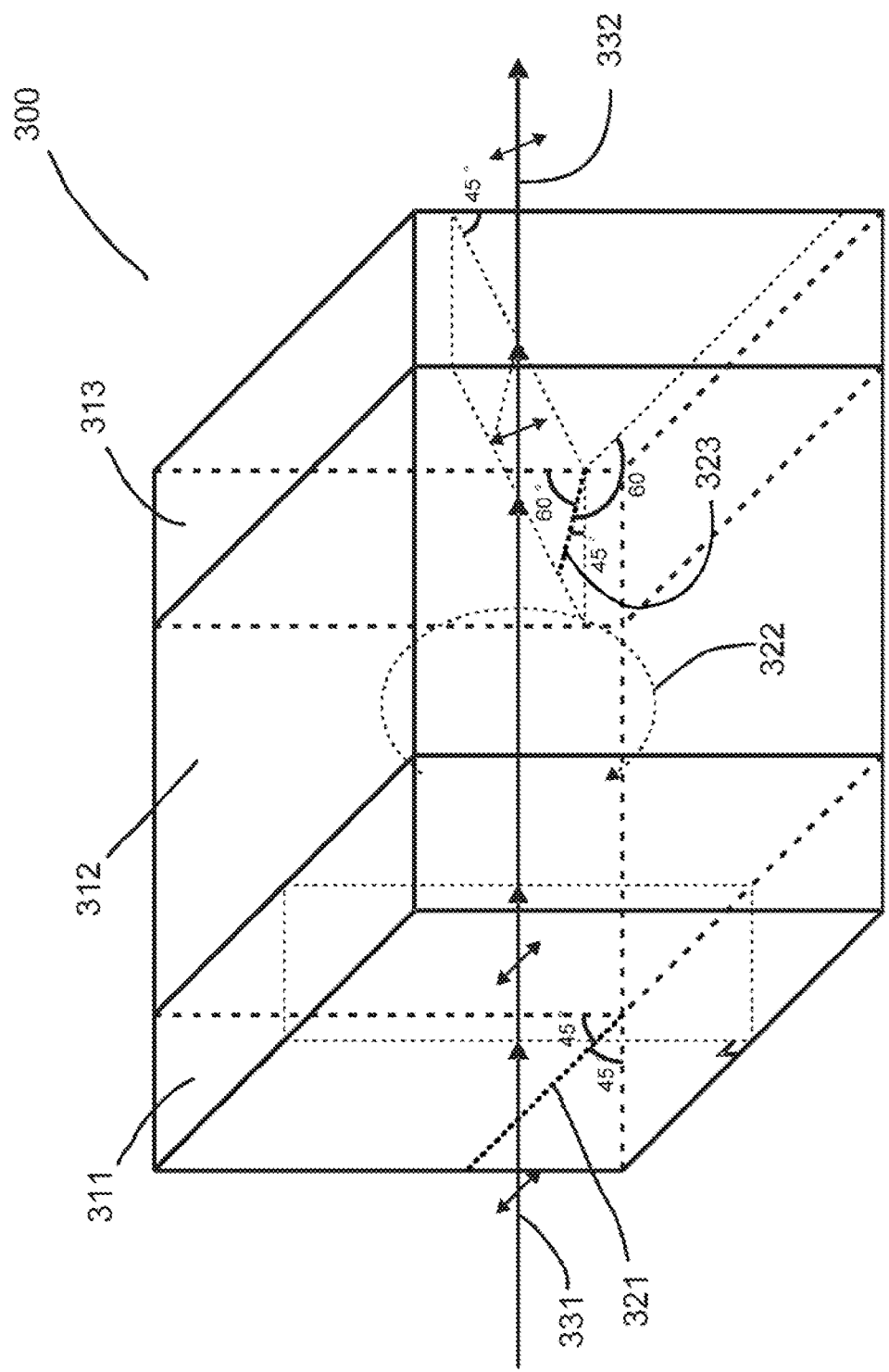
FIG. 4A is schematic diagram illustrating another optical assembly with a forward light passing through the optical assembly.
Figure 4B:
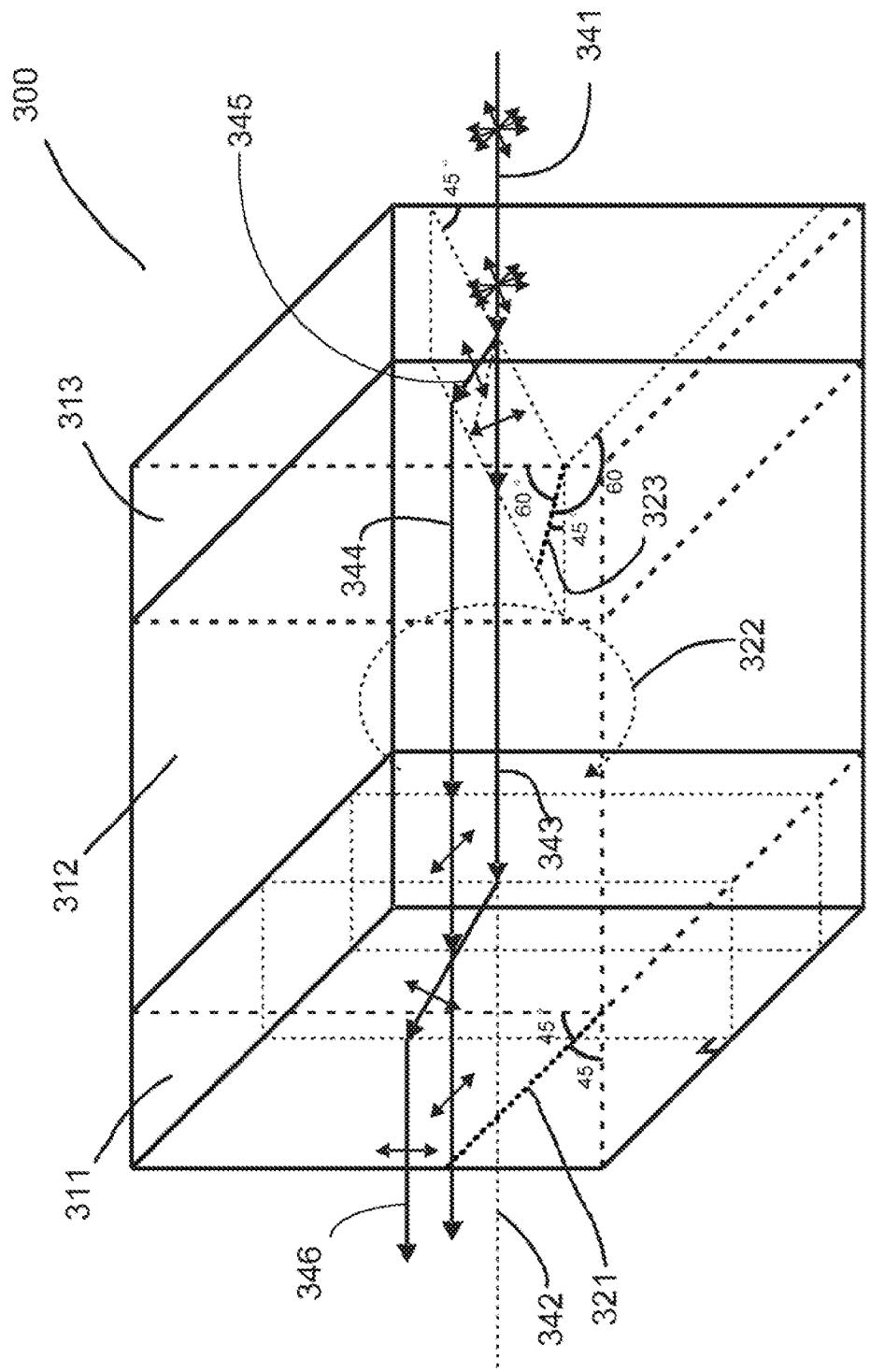
FIG. 4B illustrates the shows the optical assembly of FIG. 4A with a backward light isolated by the optical assembly.

In some embodiments, referring to FIGS. 4A and 4B, an optical assembly 300 includes a first birefringent crystal 311, a Faraday rotator 312, and a second birefringent crystal 313, which are sequentially positioned along the direction of a forward light (or an incident light) 331 emitted by a light source. Materials suitable for the first and the second birefringent crystals include Yttrium Vanadate Crystal (YVO$_4$) and calcite, which is typically much less expensive than a polarizing crystal. The first birefringent crystal 311, the Faraday rotator 312, and the birefringent crystal 313 can be separated by free space (or air) or other medium. The first birefringent crystal 311, the Faraday rotator 312, and the birefringent crystal 313 can also be glued together using an adhesive material or bonded together by direct optical bonding to form a unitary optical assembly 300.

The first birefringent crystal 311 has an optical axis 321 that is parallel to the viewing plane of FIG. 2A and is at an approximately 45° angle to the light-entering face of the first birefringent crystal 311. The second birefringent crystal 313 has an optical axis 323 that is at an approximately 45° angle relative to the optical axis 321. Specifically, the direction of the optical axis 323 is rotated by 45° along a direction 322 from the optical axis 321. The Faraday rotator 312 can rotate a polarization of the light through it by a rotation angle along the direction 322. The rotation angle is also approximately 45°.

A forward light 331 having its polarization perpendicular to the optical axis 321 travels without changing direction as an ordinary ray through the first birefringent crystal 311. The polarization of the forward light 331 is rotated by 45° as it travels through the Faraday rotator 312. As it exits the Faraday rotator 312, the forward light 331 has a polarization perpendicular to the optical axis 323 of the second birefringent crystal 313. The forward light 331 passes through the second birefringent crystal 313 as an ordinary ray without changing its direction, forming an output light 332.

Figure 4C:
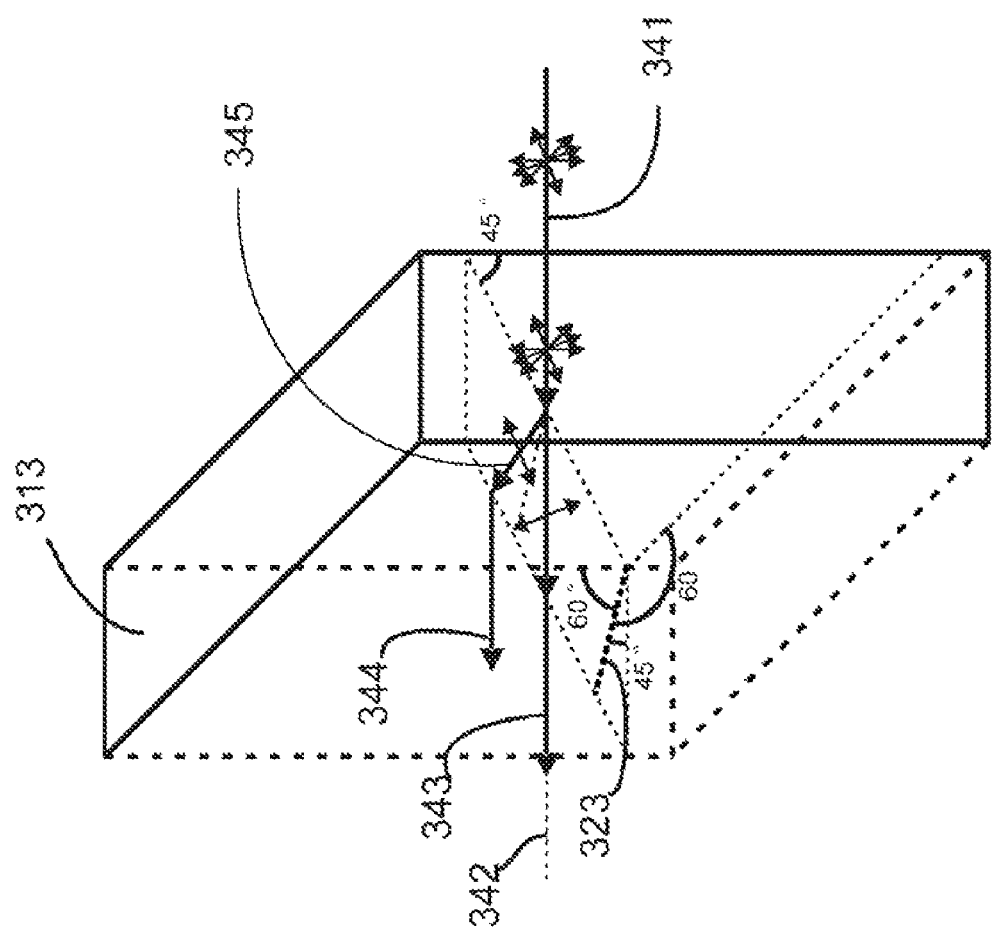
FIG. 4C shows the backward light passing the second birefringent crystal in the optical assembly of FIG. 4A.

When the randomly polarized backward lights 341 enters the second birefringent crystal 313 in a backward direction, referring to FIGS. 4B and 4C, the backward lights 341 is decomposed to travel in two different directions 342 and 345. A first backward light 343 propagates in the second birefringent crystal 313 as an ordinary ray along the direction 342 without changing direction. A second backward light 345 travels as an extraordinary ray in a different direction in the second birefringent crystal 313, forming a displaced backward light 344 as it exits the second birefringent crystal 313 and enters the Faraday rotator 312. The first backward light 343 and the displaced backward light 344 pass through the Faraday rotator 312 in two parallel paths. The polarization directions of the first backward light 343 and the displaced backward light 344 are both rotated by 45° along the 322 direction.

Figure 4D:
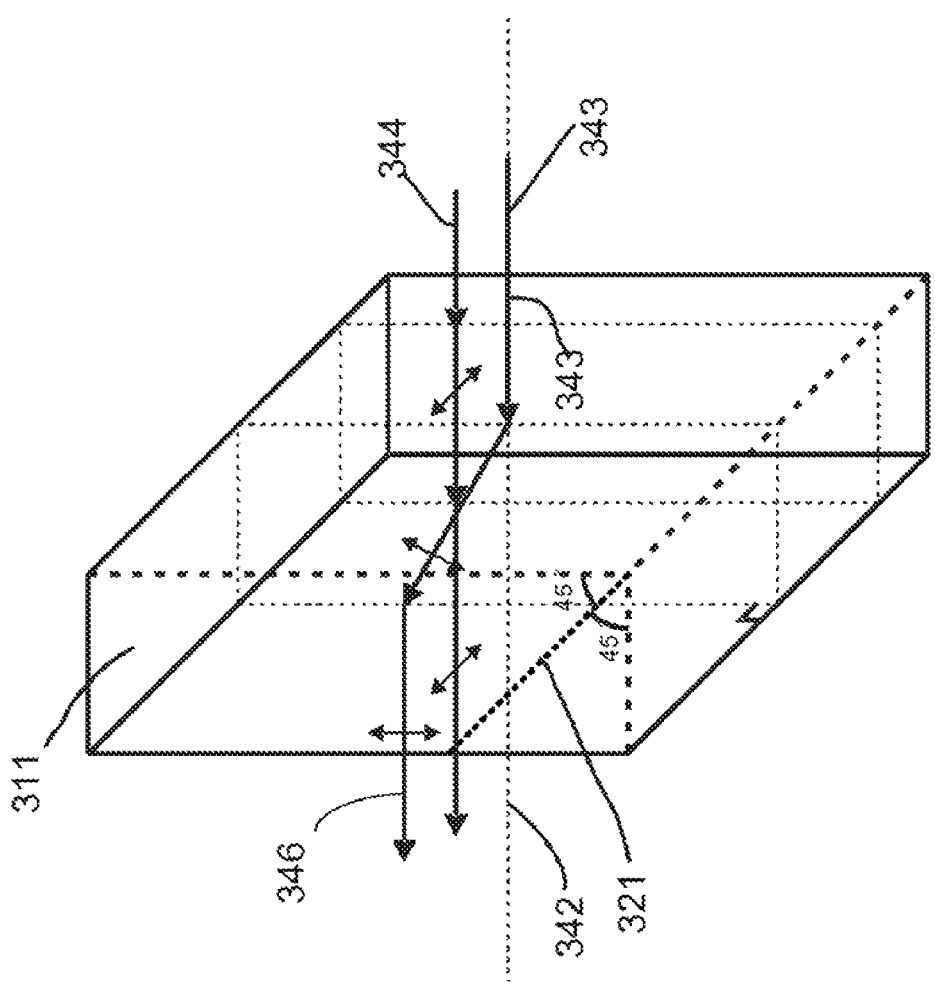
FIG. 4D shows the backward light passing the first birefringent crystal in the optical assembly of FIG. 4A.

Referring to FIGS. 4B and 4D, as it exits the Faraday rotator 312, the first backward light 343 has its polarization rotated in the plane defined by its propagation direction and the optical axis 321. Thus the first backward light 343 travels as an extraordinary ray in the first birefringent crystal 311 in a deflected direction to form a displaced backward light 346. As it exits the Faraday rotator 312, the displaced backward light 344 has a polarization perpendicular to the optical axis 321 and thus travels as an ordinary ray without changing direction through the first birefringent crystal 311. The displaced backward light 344 and 346 can subsequently be blocked or absorbed by an optical blocker (360 in FIGS. 4E and 4F), preventing the them from reaching the light source.

It should be understood that the optical assembly 300 can be made in some other configurations without deviating from the spirit of the invention. The optical axes of the birefringent crystals and the angle and the direction of rotation of the Faraday rotator can be different. Different materials can be used for the birefringent crystal. The birefringent crystals can have different birefringence or thicknesses for displacing the backward light. For example, the birefringent crystal can have a thickness in the range of 0.1 mm to 0.4 mm in the light transmission direction. The amount of displacement of the backward light, or the distance between the displaced backward lights 344, 346 and the forward light 331, can be more than 5 microns, or in a range from about 10 microns to 40 microns. For example, the birefringent crystal can have a thickness of about 0.3 mm. The backward lights can be displaced by about 30 microns.

Figure 4E:
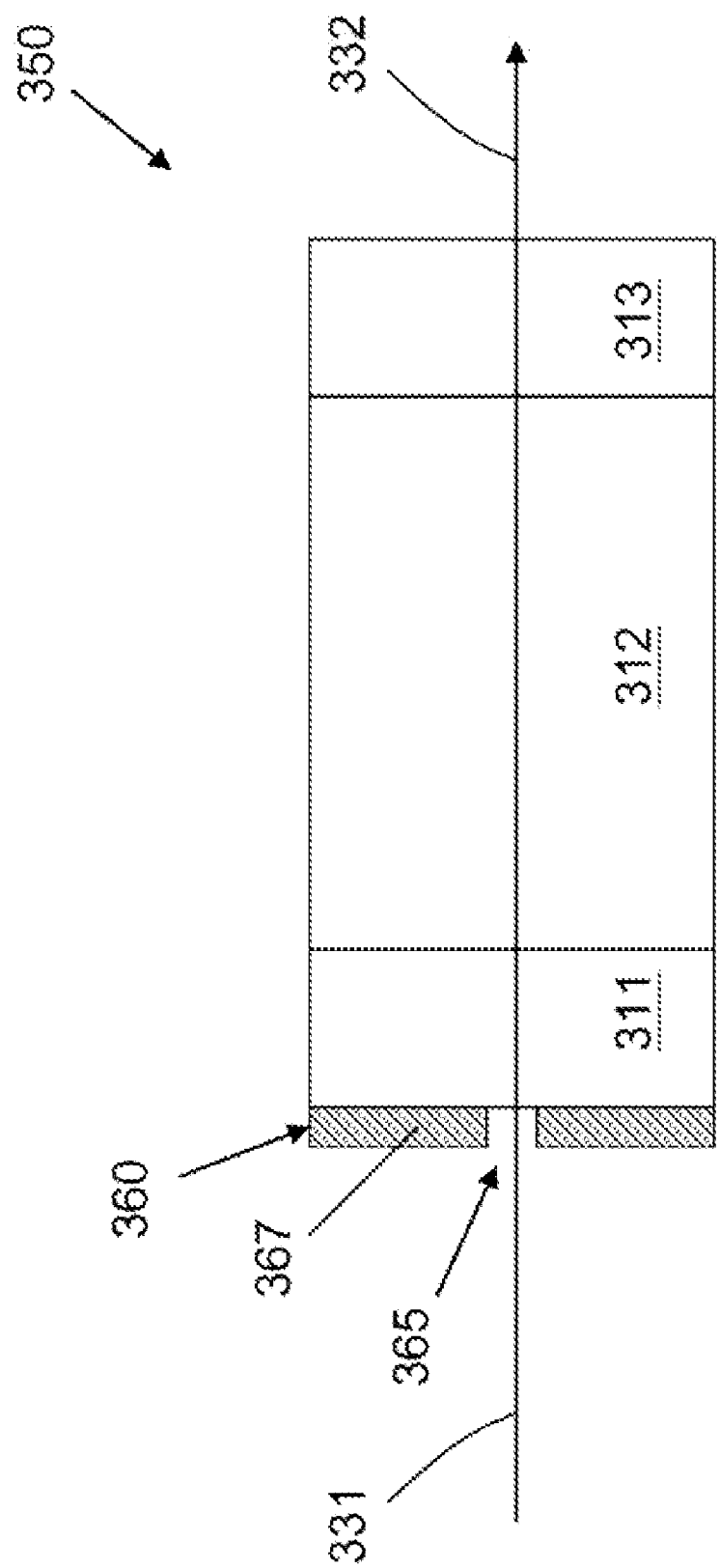
FIG. 4E shows an arrangement for an improved optical isolator employing the optical assembly in FIGS. 4A-4B illustrating a forward light passing through the optical isolator.
Figure 4F:
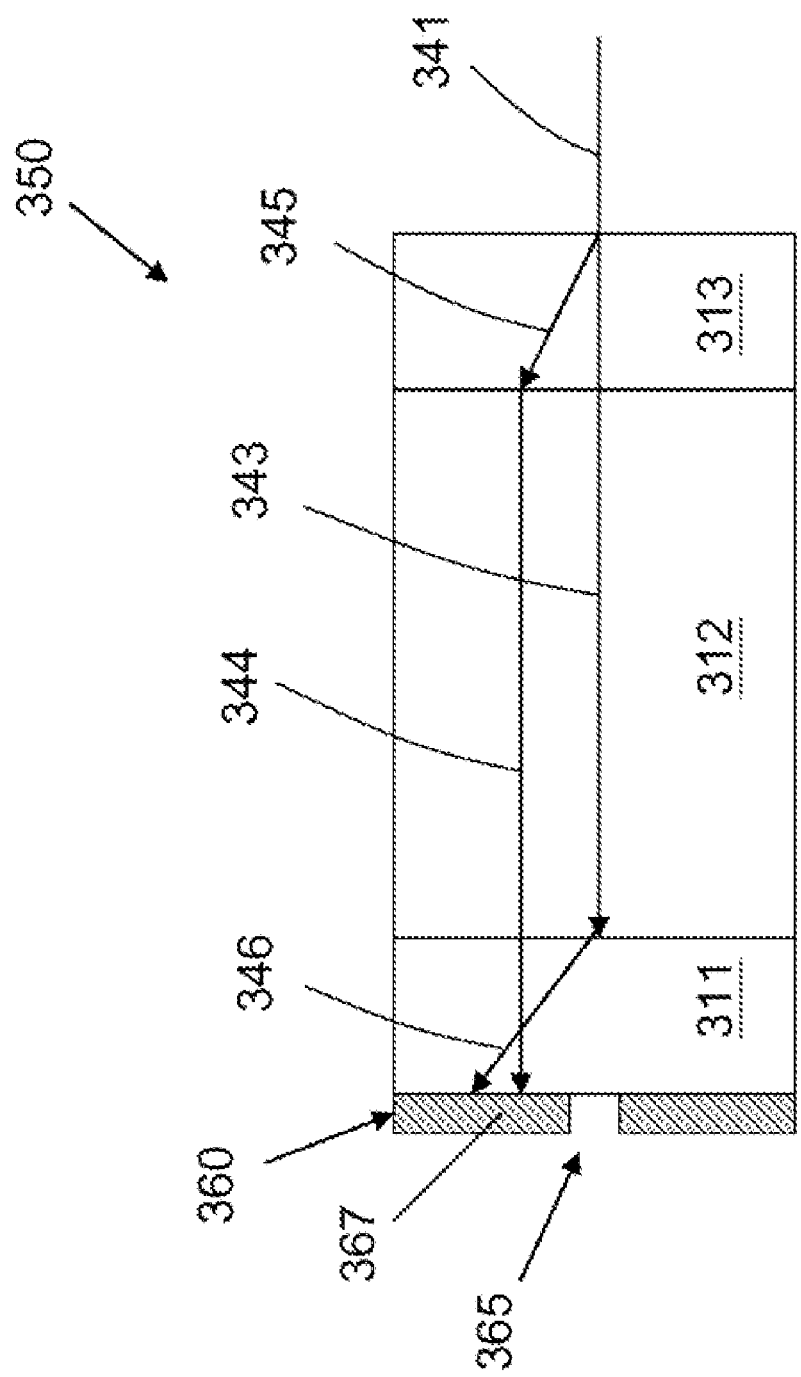
FIG. 4F shows an arrangement for an improved optical isolator FIG. 4E illustrating a backward light blocked by the optical isolator.

The optical assembly 300 can be used to construct an optical isolator 350 as shown in FIGS. 4E and 4F. The optical isolator 350 can include an opaque optical blocker 360, the first birefringent crystal 311, the Faraday rotator 312, and the second birefringent crystal 313. As described above, the first birefringent crystal 311, the Faraday rotator 312, and the second birefringent crystal 313 can be separated by free space (or air) or some other mediums, and bonded together. The opaque optical blocker 360 is positioned adjacent to or in contact with the front outer surface of the first birefringent crystal 311. The optical blocker 360 can be separated from the first birefringent crystal 311. The optical blocker 360 can also be glued to the first birefringent crystal 311, which allows the optical isolator 350 to form a unitary component.

The optical blocker 360 is made of an opaque and preferably, light absorbing, material such as metallic, polymeric, or an inorganic material. In some embodiment, a layer of light absorbing material such as amorphous carbon can be coated on a portion of the outer surface of the first birefringent crystal 311. The optical blocker 360 exposes a portion of the outer surface of the first birefringent crystal 311 to allow the forward light 331 to enter the first birefringent crystal 311. The optical blocker 360 can also block and/or absorb the displaced backward lights 344 and 346, preventing them from exiting the first birefringent crystal 311, thus isolating the backward light from the light source. The optical blocker 360 can exist in many different forms as long as it provides the above described functions. For example, the optical blocker 360 can be an aperture structure that includes an opening 365 that allows the forward light 331 to enter and pass through the first birefringent crystal 311, the Faraday rotator 312, and the second birefringent crystal 313. The aperture structure includes opaque portion 367 that can block and absorb the displaced backward lights 344 and 346.

In some embodiments, the opaque optical blocker 360 is provided by a housing wall or an outer surface of another optical component in the optical system that the optical assembly 300 is installed. An example of an optical system is a laser system. In other words, a dedicated optical blocker is not provided with the optical assembly 300. The optical assembly 300 can be used as a stand-alone optical isolator, which simplifies the optical isolator and can further reduce cost.

It should be understood that the disclosed optical assemblies and optical isolators can be used in a wide range of optical applications such as laser devices. The disclosed optical assemblies and optical isolators can be made in compact sizes and with inexpensive materials. The disclosed optical assemblies and optical isolators can be produced as unitary components in factories, thus saving the assembly time and cost when they are incorporated into optical devices.

The optical blocker for the above disclosed optical isolators can be implemented in many different forms. For example, an optical blocker can include a continuous opaque portion and an edge. The continuous opaque portion can block the displaced backward light. The forward light enters the optical assembly beyond the edge and not covered by the opaque portion. The continuous opaque portion can for example cover substantial portion of the front outer surface of the optical assembly. Alternatively, the continuous opaque portion can be in the form of an island or a pad that only covers the area of the front outer surface where the displaced backward light reaches the optical blocker.

What is claimed is:

1. An optical isolator, comprising:
  a first birefringent material comprising a surface configured to receive a forward light propagating in a forward direction and to receive a backward light propagating opposite to the forward direction, wherein the first birefringent material has an optical axis at about 45 degree angle relative to the surface, wherein the forward light has a first polarization aligned perpendicular to the optical axis and is configured to travel through the first birefringent material as an ordinary ray substantially along the forward direction, wherein at least a portion of the backward light has a second polarization not perpendicular to the optical axis, wherein the at least a portion of the backward light travels substantially as an extraordinary ray in the first birefringent material, wherein the first birefringent material is configured to displace the backward light to form a first displaced backward light, wherein the first displaced backward light is separated by about 10-40 microns from the forward light;
a Faraday rotator configured to rotate the forward light by a predetermined angle along a rotation direction, wherein the Faraday rotator is configured to rotate the backward light or the first displaced backward light by substantially the same predetermined angle along the rotation direction; and
an optical blocker configured to block the first displaced backward light.

2. The optical isolator of claim 1, further comprising a polarizer having a polarization axis oriented at about 45 degrees relative to the first polarization, wherein the polarizer is configured to pass the forward light and to pass the portion of the backward light having the second polarization.

3. The optical isolator of claim 2, wherein the polarizer, the Faraday rotator, and the first birefringent material are sequentially positioned along the forward direction.

4. The optical isolator of claim 2, wherein the first birefringent material, the Faraday rotator, and the polarizer are sequentially positioned along the forward direction.

5. The optical isolator of claim 2, wherein the polarizer, the Faraday rotator, and the first birefringent material are held in contact with each other to form a unitary component.

6. The optical isolator of claim 1, further comprising a second birefringent material having a polarization axis oriented at 45 degrees relative to the optical axis, wherein the second birefringent material is configured to allow the forward light to pass through along the forward direction and to displace the portion of the backward light having the second polarization not perpendicular to the optical axis to produce a second displaced backward light.

7. The optical isolator of claim 6, wherein the forward light travels substantially as an ordinary ray in the second birefringent material, wherein at least a portion of the backward light travels substantially as an extraordinary ray in the second birefringent material.

8. The optical isolator of claim 6, wherein the polarization axis is rotated by about 45 degrees from the optical axis along the rotation direction.

9. The optical isolator of claim 6, wherein the first birefringent material, the Faraday rotator, and the second birefringent material are held in contact with each other to form a unitary component.

10. The optical isolator of claim 6, wherein the optical blocker is configured to also block the second displaced backward light.

11. The optical isolator of claim 1, wherein the predetermined angle is between about 40 degrees and about 50 degrees.

12. An optical isolator, comprising:
a birefringent material configured to receive a forward light propagating in a forward direction and to receive a backward light propagating opposite to the forward direction, wherein the birefringent material has an optical axis, wherein the forward light has a first polarization aligned perpendicular to the optical axis and is configured to pass through the birefringent material substantially along the forward direction, wherein at least a portion of the backward light has a second polarization not perpendicular to the optical axis, wherein the birefringent material is configured to displace the backward light to form a displaced backward light, wherein the displaced backward light is separated by about 10-40 microns from the forward light;
a Faraday rotator configured to rotate the forward light by a rotation angle between about 40 degrees and about 50 degrees along a rotation direction, wherein the Faraday rotator is configured to rotate the backward light or the displaced backward light by substantially the same rotation angle along the rotation direction;
a polarizer having a polarization axis oriented at about 45 degrees relative to the first polarization, wherein the polarizer is configured to pass the forward light and to pass the portion of the backward light having the second polarization; and
an optical blocker configured to block the displaced backward light.

13. The optical isolator of claim 12, wherein the forward light travels substantially as an ordinary ray in the birefringent material, wherein at least a portion of the backward light travels substantially as an extraordinary ray in the birefringent material.

14. The optical isolator of claim 12, wherein the birefringent material comprises a surface that receives the forward light, wherein the optical axis is at about 45 degree angle relative to the surface.

15. The optical isolator of claim 12, wherein the polarizer, the Faraday rotator, and the birefringent material are sequentially positioned along the forward direction.

16. The optical isolator of claim 12, wherein the birefringent material, the Faraday rotator, and the polarizer are sequentially positioned along the forward direction.

17. The optical isolator of claim 12, wherein the polarizer, the Faraday rotator, and the birefringent material are held in contact with each other to form a unitary component.

18. An optical isolator, comprising:
a first birefringent material configured to receive a forward light propagating in a forward direction and to receive a backward light propagating opposite to the forward direction, wherein the first birefringent material has an optical axis, wherein the forward light has a first polarization aligned perpendicular to the optical axis and is configured to pass through the first birefringent material substantially along the forward direction, wherein at least a portion of the backward light has a second polarization not perpendicular to the optical axis, wherein the first birefringent material is configured to displace the backward light to form a first displaced backward light, wherein the first displaced backward light is separated by about 10-40 microns from the forward light;
a Faraday rotator configured to rotate the forward light by a rotation angle between about 40 degrees and about 50 degrees along a rotation direction, wherein the Faraday rotator is configured to rotate the backward light or the first displaced backward light by substantially the same rotation angle along the rotation direction;
a second birefringent material having a polarization axis oriented at 45 degrees relative to the optical axis, wherein the second birefringent material is configured to allow the forward light to pass through along the forward direction and to displace the portion of the backward light having the second polarization not perpendicular to the optical axis to produce a second displaced backward light; and
an optical blocker configured to block the first displaced backward light and the second displaced backward light.

19. The optical isolator of claim 18, wherein the forward light travels substantially as an ordinary ray in the first birefringent material and the second birefringent material.

20. The optical isolator of claim 18, wherein at least a portion of the backward light travels substantially as an extraordinary ray in the first birefringent material and as an ordinary ray in the second birefringent material.

21. The optical isolator of claim 18, wherein the polarization axis is rotated by about 45 degrees from the optical axis along the rotation direction.

22. The optical isolator of claim 18, wherein the first birefringent material, the Faraday rotator, and the second birefringent material are held in contact with each other to form a unitary component.

23. An optical isolator, comprising:
   a first birefringent material configured to receive a forward light propagating in a forward direction and to receive a backward light propagating opposite to the forward direction, wherein the first birefringent material has an optical axis, wherein the forward light has a first polarization aligned perpendicular to the optical axis and is configured to pass through the first birefringent material substantially along the forward direction, wherein at least a portion of the backward light has a second polarization not perpendicular to the optical axis, wherein the first birefringent material is configured to displace the backward light to form a first displaced backward light, wherein the first displaced backward light is separated by about 10-40 microns from the forward light;
   a Faraday rotator configured to rotate the forward light by a predetermined angle along a rotation direction, wherein the Faraday rotator is configured to rotate the backward light or the first displaced backward light by substantially the same predetermined angle along the rotation direction; and
   an optical blocker configured to block the first displaced backward light.

24. The optical isolator of claim 23, wherein the forward light travels substantially as an ordinary ray in the first birefringent material, wherein at least a portion of the backward light travels substantially as an extraordinary ray in the first birefringent material.

25. The optical isolator of claim 23, wherein the first birefringent material comprises a surface that receives the forward light, wherein the optical axis is at about 45 degree angle relative to the surface.

* * * * *